US009713966B2

(12) United States Patent
Barlini et al.

(10) Patent No.: US 9,713,966 B2
(45) Date of Patent: Jul. 25, 2017

(54) ELECTRICAL POWER SUPPLY SYSTEM FOR AN ELECTRICALLY PROPELLED VEHICLE AND METHODS OF CONTROLLING SUCH AN ELECTRICAL POWER SUPPLY SYSTEM

(71) Applicant: ALSTOM TRANSPORT TECHNOLOGIES, Saint-Ouen (FR)

(72) Inventors: Davide Barlini, Milan (IT); Michele Losito, Cisano Bergamasco (IT)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/133,856

(22) Filed: Apr. 20, 2016

(65) Prior Publication Data

US 2016/0304000 A1 Oct. 20, 2016

(30) Foreign Application Priority Data

Apr. 20, 2015 (EP) ..................................... 15305594

(51) Int. Cl.
*B60M 7/00* (2006.01)
*B60M 3/06* (2006.01)
(Continued)

(52) U.S. Cl.
CPC .............. *B60M 7/003* (2013.01); *B60M 1/18* (2013.01); *B60M 3/06* (2013.01); *B61C 17/06* (2013.01)

(58) Field of Classification Search
CPC . B60M 3/00; B60M 3/06; B60M 7/00; B60M 7/006; B60M 7/003; B61C 17/06
See application file for complete search history.

(56) References Cited

U.S. PATENT DOCUMENTS

2002/0096412 A1* 7/2002 Batisse ..................... B60L 9/18
191/22 R
2002/0139629 A1* 10/2002 Nogaret ..................... B60L 9/22
191/2
(Continued)

FOREIGN PATENT DOCUMENTS

DE 10233842 B3 * 3/2004 .............. B60M 1/18
EP 2848458 A1 3/2015
FR 2398634 A2 2/1979

OTHER PUBLICATIONS

Extended European Search Report issued Oct. 12, 2015 in corresponding EP Application No. 15305594.2.

*Primary Examiner* — Jason C Smith
(74) *Attorney, Agent, or Firm* — Knobbe Martens Olson & Bear LLP (57) ABSTRACT

An electrical power supply system for an electrically propelled vehicle provided with a traction unit and an electrical connector and moving along a circulation rail includes an external power supply zone having a supply line extending along the circulation rail for connection with the electrical connector, and an autonomous power supply zone, located after the external power supply zone along the circulation rail. The supply line includes a main section. The supply line includes a terminal section, extending along the circulation rail in the external power supply zone at least between a first end of the main section and the autonomous power supply zone, for connection with the electrical connector, and a diode, electrically connecting the first end of the main section and a second end of the terminal section and designed to let an electrical current pass through from the main section to the terminal section.

9 Claims, 7 Drawing Sheets (51) Int. Cl.
*B61C 17/06* (2006.01)
*B60M 1/18* (2006.01)

(56) References Cited

U.S. PATENT DOCUMENTS

| | | | | |
|---|---|---|---|---|
| 2006/0145543 | A1* | 7/2006 | Hoffman | B60L 13/03 310/12.09 |
| 2007/0262737 | A1* | 11/2007 | Hoffmann | B60L 13/10 318/135 |
| 2008/0205094 | A1* | 8/2008 | Henning | B60L 13/10 363/37 |
| 2009/0195076 | A1* | 8/2009 | Glaubitz | B60L 13/10 307/69 |
| 2010/0213765 | A1* | 8/2010 | Engel | B60M 3/00 307/69 |
| 2013/0154553 | A1* | 6/2013 | Steele | B60L 11/182 320/108 |
| 2016/0167678 | A1* | 6/2016 | Jestin | B60L 3/04 320/109 |

* cited by examiner

ELECTRICAL POWER SUPPLY SYSTEM FOR AN ELECTRICALLY PROPELLED VEHICLE AND METHODS OF CONTROLLING SUCH AN ELECTRICAL POWER SUPPLY SYSTEM

TECHNICAL FIELD OF THE INVENTION

The present invention relates to an electrical power supply system for an electrically propelled vehicle. The invention also relates to a method of controlling an electrical power supply system of the above-mentioned type, while the vehicle is moving from an external power supply zone towards an autonomous power supply zone and vice versa.

BACKGROUND ART OF THE INVENTION

In the electrical alimentation of vehicle field, in particular for electrically propelled vehicles, it is known to provide the vehicle with an autonomous power supply device, such as a battery or some capacitors, an electric connection member, such as a pantograph, and a power supply bus which electrically connects the pantograph and the battery to an electric motor of the vehicle.

Thus, it is known to use an electrical power supply system, including an external power supply zone and an autonomous power supply zone. The vehicle is supplied in the external power supply zone by means of an external power supply infrastructure, such as a catenary line. The pantograph realizes the electrical contact between the catenary line and the power supply bus of the vehicle. Once the pantograph is connected to the catenary line, an electric current flows between the catenary line and power supply bus of the vehicle.

On the opposite, when it is in the autonomous power supply zone, the vehicle is supplied by means of the autonomous power supply device.

However, while the vehicle is moving from a power supply zone to the other one, in particular in the instant when the pantograph is connecting or disconnecting from the catenary line, an electric arc is generated between the catenary line and the pantograph, as the electric current flowing between them does not extinguish instantaneously. The electric arc generated between the catenary line and the pantograph should be avoided since it may provoke detriments of the catenary line and of the pantograph, as well as a remarkable electromagnetic noise.

As explained in WO-A-2011/147708, it is therefore preferred to equip the power supply bus of the vehicle with an electrical protection device, such as a diode, which allows the electric current to pass only from the pantograph to the power supply bus of the vehicle. In other words, the diode mounted on the power supply bus of the vehicle is continuously crossed by the electric current of the catenary line for the power supply.

This approach leads to some technical inconvenients. First, the diode needs to be continuously cooled down by a proper system placed in the vehicle, in order to keep the right operating temperature. Second, the diode blocks any current flowing from the power supply bus towards the catenary line, which means that no electrical braking regeneration can be performed.

SUMMARY OF THE INVENTION

One object of this invention is to remedy this drawback more particularly by proposing a novel electrical power supply system which definitively suppresses the electric arc generation but allows electrical braking regeneration.

To this end, the invention concerns an electrical power supply system for an electrically propelled vehicle provided with a traction unit and an electrical connection member and moving along a circulation rail, the system including:
- an external power supply zone, having a supply line extending along the circulation rail for connection with the electrical connection member, the supply line being connected to a power supply infrastructure,
- an autonomous power supply zone, located after the external power supply zone along the circulation rail, where the vehicle is supplied by means of an autonomous power supply device,
the supply line including a main section, provided with a first end,
the external power supply system being characterized in that the supply line includes moreover:
- a terminal section, extending along the circulation rail in the external power supply zone at least between the first end of the main section and the autonomous power supply zone, for connection with the electrical connection member and provided with a second end,
- a diode, electrically connecting the first end of the main section and the second end of the terminal section and designed to let passing through an electrical current from the main section to the terminal section.

Owing to the invention, the diode is mounted directly on the supply line and it is crossed by the electric current only when the electrical connection member is connected to the terminal section, which is for a limited time interval. Moreover, the electrically braking regeneration is allowed along the main section of the supply line. Such a power supply system does not need therefore a cooling system dedicated to the diode.

According to further aspects of the invention which are advantageous but not compulsory, such an electrical power supply system might incorporate one or more of the following features taken in any admissible configuration:
- the first end of the main section and the second end of the terminal section are partially overlapped on a transition portion along the direction of the circulation rail and the supply line is designed for the diode to be short-circuited between the first end of the main section and the second end of the terminal section by the electrical connection member;
- the terminal section is isolated, except from the main section and the connection member, and it has a floating voltage;
- the said electric power supply includes a detecting unit designed to predict in time the position of the electrical connection member of the vehicle along the supply line;
- it includes:
  - means for driving of an output voltage of the autonomous power supply device of the vehicle in relation to an output voltage of the supply line, when the connection member of the vehicle is connected to the terminal section from the external power supply zone,
  - means for disconnecting of the connection member of the vehicle only from the terminal section of the supply line;
- the said electrical power supply system includes means for setting the output voltage of the autonomous power supply device higher than the output voltage of the supply line while the connection member of the vehicle is in the terminal section and the vehicle is in a traction mode, in which the traction unit of the vehicle transforms the power supply in kinetic energy;

it includes:
  means for setting the output voltage of the autonomous power supply device lower than the output voltage of the supply line while the connection member of the vehicle is before the terminal section;
  means for setting the output voltage of the autonomous power supply device higher than the output voltage of the supply line while the connection member of the vehicle is in the terminal section when the vehicle is in a braking mode, in which the traction unit of the vehicle transforms the kinetic energy in electrical energy;

it includes:
  means for connecting the connection member of the vehicle only to the terminal section of the supply line, means for driving of an output voltage of the autonomous power supply device of the vehicle in relation to an output voltage of the supply line, when the connection member of the vehicle is connected to the terminal section from the autonomous power supply zone;

the said electrical power supply system includes means for setting the output voltage of the autonomous power supply device lower than the output voltage of the supply line while the connection member of the vehicle is in the terminal section and the vehicle is in a traction mode, in which the traction unit of the vehicle transforms the power supply in kinetic energy;

it includes:
  means for setting the output voltage of the autonomous power supply device lower than the output voltage of the supply line while the connection member of the vehicle is before the main section;
  means for setting the output voltage of the autonomous power supply device higher than the output voltage of the supply line while the connection member of the vehicle is in the main section, when the vehicle is in braking mode, in which the traction unit of the vehicle transforms the kinetic energy in electrical energy.

BRIEF DESCRIPTION OF THE DRAWINGS

The present invention and it advantages will be well understood on the basis of the following description, which is given as an illustrative example, without restricting the scope of the invention and in relation with the annexed drawings. In the drawings.

DETAILED DESCRIPTION OF SOME EMBODIMENTS

Figure 1:
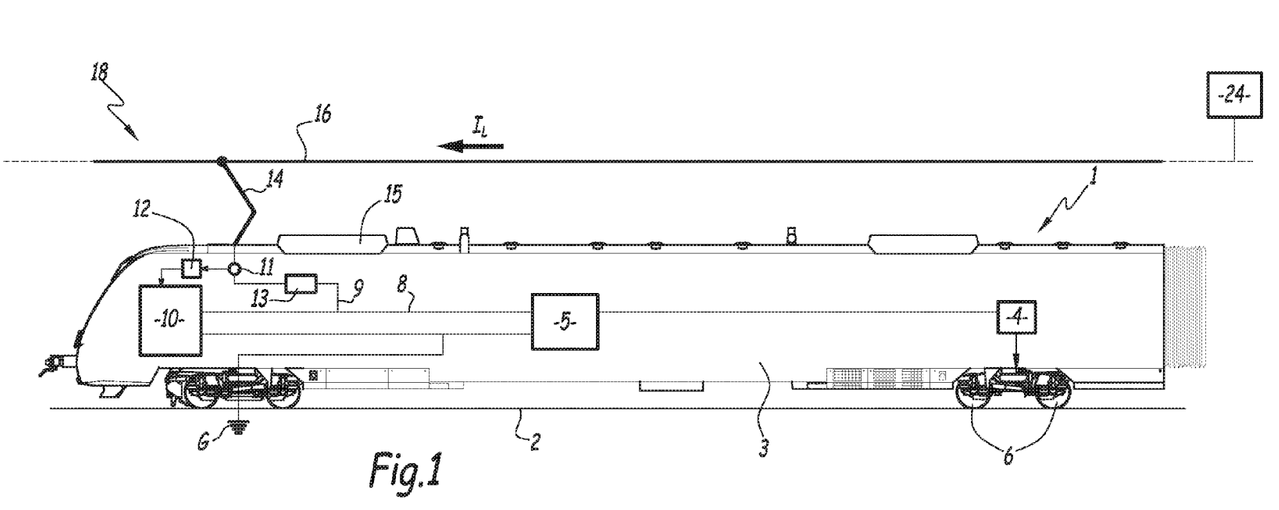
FIG. 1 is a schematic representation of an electrically propelled vehicle on a circulation rail and connected to a supply line of an electrical power supply system according to the invention.

FIG. 1 shows an electrically propelled vehicle 1, such as a railway vehicle, for example a train or a tramway, which is designed to move along a circulation rail 2. The vehicle 1 includes a chassis 3, an electric motor 4, a traction unit 5, several railway wheels 6, a power supply bus 8 and an external line 9. Moreover, an autonomous power supply device 10, a current sensor 11 and a control unit 12 are located in the vehicle 1 and are part of a supply system which is described below. Finally, the vehicle 1 includes an inductance 13 and an electrical connection member 14.

The chassis 3 is supported with respect to the ground G by the wheels 6, two of these wheels 6 being visible on FIG. 1. Therefore, the chassis 2 represents the electric mass, or the zero voltage reference, of the vehicle 1.

The electric motor 4 is, for example, a reversible electric motor and it is compatible with electrical regenerative braking. In other words, the electric motor 4 absorbs electric energy while the vehicle 1 is in a traction mode and supplies electric energy when the vehicle is in a braking mode. Therefore, electric motor 4 is mechanically connected to the wheels 6 of the vehicle 1 and it is designed to transform the electric energy in a kinetic energy of the wheels 6 when it is in the traction mode and, on the opposite, to transform the kinetic energy of the wheels 6 in the electric energy when it is in the braking mode. The electric motor 4 is, for example, an alternating current triphase electric motor.

The traction unit 5 is connected to the electric motor 4 and is designed to supply or collect electric energy to or from the motor 4. In particular, the traction unit 5 is designed to convert a direct electric current in an alternating electric current for the motor 4 during the traction mode.

On the opposite, during the braking mode, it is designed as well to supply electric energy coming from the motor 4 to the autonomous power supply 10. In particular, the traction unit 5 is designed to convert an alternating electric current produced by the motor 4 in a direct electric current.

The traction unit 5 is, for example, a power inverter.

The power supply bus 8 electrically connects the traction unit 5 to the external line 9 and to the autonomous power supply device 10. The power supply bus 8 is then designed to be powered up at a voltage potential which is supplied by the external line 9, the device 10 or the traction unit 5. In other words, the bus 8 is designed to transfer a direct current from and towards the traction unit 5. The power supply bus 8 also connects the traction unit 5 and the device 10 to the chassis 2 of the vehicle, assuring earthing of any electric current.

The autonomous power supply device 10 is designed to supply the electrical energy to the traction unit 5 during the traction mode or to store the electrical energy supplied by the traction unit 5 during the braking mode or the electrical energy supplied through the external line 9. In particular, the device 10 is able to produce an output voltage $V_A$ on the power supply bus 8 so that a direct current $I_A$ is generated and transferred to the traction unit 5. The output voltage $V_A$ has a variable value.

The autonomous power supply device 10 is provided, for example, with a battery or some capacitors.

The current sensor 11 is designed to measure a direct current flowing in the external line 9 and to give an information whether it measures a current or not to the control unit 12.

The control unit 12 is designed to receive the information about the current flowing in the external line 9 from the current sensor 11. The control unit 12 is designed as well to drive and set the output voltage $V_A$ of the autonomous power supply device 10, while this is supplying the direct current $I_A$ to the traction unit 5 during the traction mode and depending on the position of the pantograph 14 along the supply line 16 and the position and the direction of the vehicle 1 along the circulation rail 2. The control unit 12 sets the output voltage $V_A$ by switching on or off one or several rheostat choppers, which are not shown in the figures. The setting operated by the control unit 12 on the output voltage $V_A$ is lower than 500 ms, generally included between 200 and 300 ms.

The inductance 13 is connected in series to the external line 9 and is designed to attenuate an inrush current through the external line 9. Thus, the external line 9 is designed to electrically connect the electrical connection member 14 to the power supply bus 8.

The electrical connection member 14 is, for example, a pantograph and it is placed on the roof of the vehicle 1. The pantograph 14 is designed to be mechanically controlled by a driver of the vehicle 1. In particular, the pantograph 14 can be raised up or dropped down by means of a mechanic unit 15 which is placed on the roof of the vehicle 1 and which is electrically controlled by the driver of the vehicle 1.

When the pantograph 14 is raised up, it is designed to electrically connect a supply line 16 to the external line 9 of the vehicle 1. The supply line 16 is external of the vehicle 1 and part of an electrical power supply system 18.

The electrical power supply system 18 is designed to supply a direct electric current to the traction unit 5 by means of the autonomous power supply device 10 and the control unit 12 or the supply line 16. The electrical power supply system 18 includes an external power supply zone 20 and an autonomous power supply zone 22. According to the direction of the vehicle 1 along the circulation rail 2, the zone 20 and 22 follow one another.

The external power supply zone 20 includes the supply line 16 and a power supply infrastructure 24.

The supply line 16 extends along the circulation rail 2 for connection with the pantograph 14 and is connected to the power supply infrastructure 24.

The infrastructure 24 is designed to supply with electric energy the supply line 16. In particular, the infrastructure 24 is designed to produce an output voltage $V_L$ on the supply line 16. The output voltage $V_L$ has a standard value which is, for example, equal or close to 750 V. The output voltage $V_L$ is designed to generate a direct electric current $I_L$ only when the pantograph 14 is connected to the supply line 16. In other words, the direct current $I_L$ flows in the supply line 16, is absorbed by the pantograph 14 and is transferred to the traction unit 5, when the pantograph 14 is connected to the supply line 16 at the output voltage $V_L$.

Figure 2:
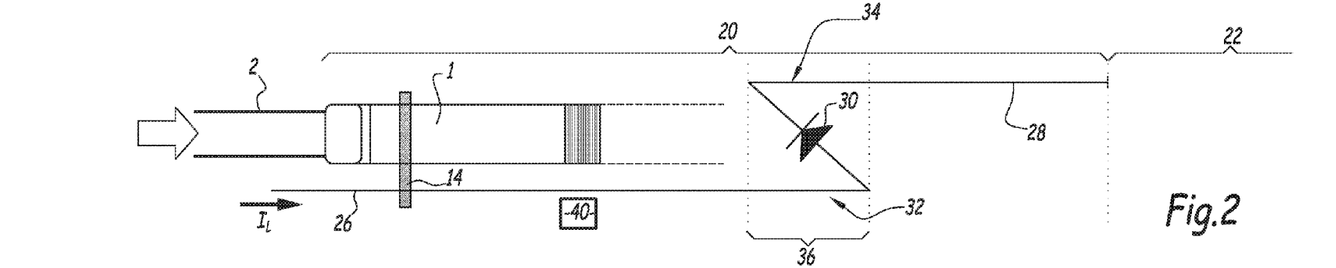
FIG. 2 is a schematic representation from an aerial point of view of the vehicle and of the electrical power supply system of FIG. 1, when the vehicle is moving along the circulation rail from an external power supply zone towards an autonomous power supply zone of the electrical power supply system.

As shown on FIG. 2, the supply line 16 includes a main section 26, a terminal section 28 and a diode 30. Therefore, the main section 26, the terminal section 28 and the diode 30 are located in the external power supply zone 20.

The main section 26 extends along the circulation rail 2 for connection with the pantograph 14 and is provided with a first end 32. The main section 26 is permanently powered up at the output voltage $V_L$ of the supply line 16 which is produced by the infrastructure 24.

The terminal section 28 extends along the circulation rail 2 for connection with the pantograph 14 and is provided with a second end 34. The terminal section 28 has a floating voltage and is isolated except for the main section 26 and the pantograph 14. Thus, the main section 26 and the pantograph 14 represent the only voltage sources for the terminal section 28.

The first end 32 of the main section 26 and the second end 34 of the terminal section 28 are partially overlapped along the direction of the circulation rail 2, defining therefore a transition portion 36 in the external power supply line 20.

The diode 30 is designed to electrically connect the main section 26 and the terminal section 28 and to let passing through any electrical current from the main section 26 to the terminal section 28. In particular, the diode 30 is connected between the first end 32 of the main section 26 and the second end 34 of the terminal section 28. Along the supply line 16, moving from the main section 26 towards the terminal section 28, since the ends 32 and 34 are overlapped, the diode 30 is arranged backwards.

Then, the diode 30 is arranged to be short circuited between the first end 32 of the main section 26 and the second end 34 of the terminal section 28 by the pantograph 14.

The electrical power supply system 18 includes moreover a detecting unit 38 and an emitter unit 40.

The emitter unit 40 is placed on the zone 20 at a known distance from the transition portion 36 and from the terminal section 28. The emitter unit 40 is designed to emit a radio signal flagging its presence along the zone 20.

The detecting unit 38 is located in the vehicle 1 and is designed to receive the radio signal from the emitter unit 40. The detecting unit 38 is provided with a data of the distance between the emitter unit 40 and the transition portion 36 and with a data of the distance between the emitter unit 40 and the terminal section 28. When the detecting unit 38 receives the radio signal from the emitter unit 40, it is designed to compute the position, along the supply line 16, of the pantograph 14 in relation to the emitter unit 40 and, therefore, in relation to the transition portion 36 and the terminal section 28. Moreover, the detecting unit 38 is provided with a data of the speed of the vehicle 1. As it is known per se, knowing the position of the pantograph 14 and the speed of the vehicle 1, the detecting unit 38 is designed to predict in time the position of the pantograph 14 along the line 16. In particular, the detecting unit 38 is able to predict the instants when the pantograph 14 enters or quits the transition portion 36 and the terminal section 28.

When the vehicle 1 is in the autonomous power supply zone 22, it is the autonomous power supply device 10 which supplies the traction unit 5 in the direct current $I_A$. In particular, the current sensor 11 measures no current on the external line 9 and pass this information to the control unit 12. The control unit 12, then, sets the output voltage $V_A$ of the device 10 at the standard value of voltage, at which is set the output voltage $V_L$, so that the traction unit 5 is well supplied by the device 10.

The operating of the electrical power supply system 18 will be described here-under for four different operating situations.

Figure 3:
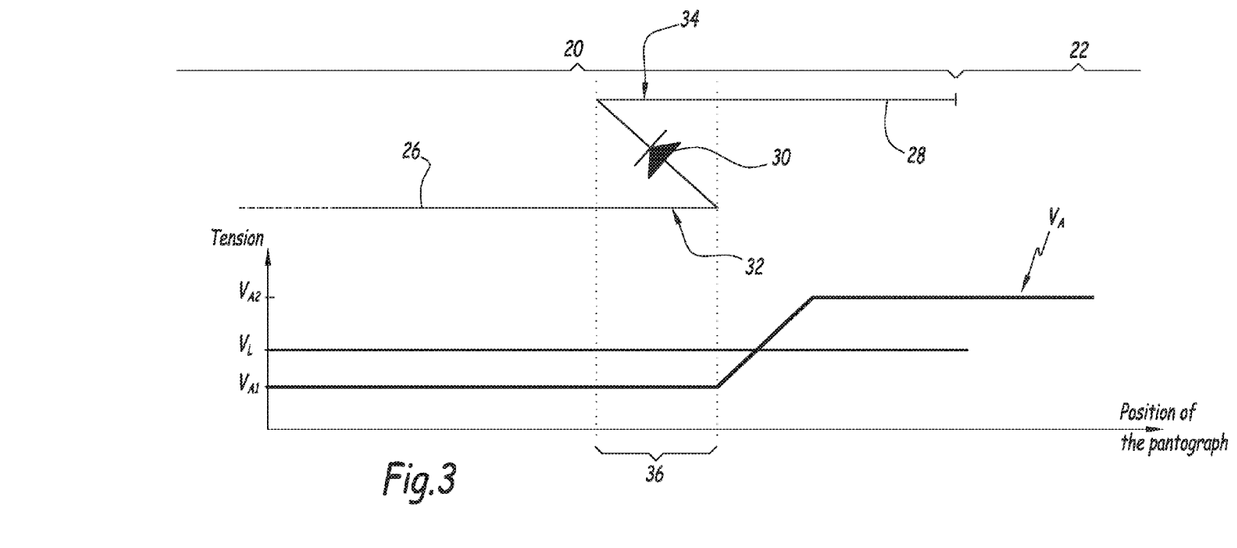
FIG. 3 is a schematic chart of two power supply voltages in relation of the position on the supply line of an electrical connection member of the vehicle which is moving according to FIG. 2 and is in a traction mode.

In a first operating situation shown in FIGS. 2 and 3, the vehicle 1 is in the traction mode which means that the traction unit 5 is supplied with energy to drive the vehicle 1. It is located in the external power supply zone 20. The pantograph 14 is raised up and connected only to the main section 26 of the supply line 16. Moreover, the vehicle 1 is moving towards the terminal section 28 and, therefore, towards the autonomous power supply zone 22. Since the vehicle 1 is the traction mode, the direct current $I_L$ is absorbed by the pantograph 14.

Since the current sensor 11 measures a current flowing through the external line 9, the control unit 12 sets the output voltage $V_A$ of the device 10 at a value $V_{A1}$, which is lower than the output voltage $V_L$. Thus, the device 10 is collecting current from the bus 8 to be charged.

The output voltage $V_L$ of the supply line 16 generates, as mentioned above, the direct current $I_L$ which is absorbed by the pantograph 14 and transferred through the external line 9 and the bus 8 to the traction unit 5 and the device 10.

Since the pantograph 14 absorbs the direct current $I_L$, the following portions of the supply line 16 which are subsequent to the pantograph 14 with respect to the motion of the vehicle 1, such as a part of the main section 26, the diode 30 and the terminal section 28, are not crossed by the direct current $I_L$.

In the motion of the vehicle 1, the detecting unit 38 receives the radio signal from the emitter unit 40 and computes the instant when the pantograph 14 will quit the transition portion 36.

In the instant when the pantograph 14 enters the transition portion 36, the diode 30 is short circuited between the first end 32 of the main section 26 and the second end 34 of the terminal section 28 by the pantograph 14.

Thus, the voltage of the terminal section 28 is the output voltage $V_L$ of the supply line 16.

In the instant when the pantograph 14 quits the transition portion 36, the diode 30 is no more short-circuited by the pantograph 14. The pantograph 14 is now connected to the terminal section 28 of the supply line 16 and, since the output voltage $V_L$ is higher than the output voltage $V_A$, the direct current $I_L$ of the supply line 16 pass through the diode 30, flows in the terminal section 28 and is absorbed by the pantograph 14.

However, in the instant when the pantograph 14 quits the transition portion 36, the control unit 12 begins to vary the output voltage $V_A$ of the autonomous power supply device 10. The control unit 12 sets the output voltage $V_A$ equal or higher than the output voltage $V_L$ of the supply line 16, as shown in FIG. 3. In particular, the control unit 12 sets the output voltage $V_A$ at a value $V_{A2}$, which is higher than the voltage $V_L$.

This setting requires a time lower than 300 ms. Thus, while the output voltage $V_L$ of the supply line 16 is still higher than the output voltage $V_A$ of the device 10, the direct current $I_L$ of the supply line 16 flows in the terminal section 28 and is absorbed by the pantograph 14, as mentioned above.

On the opposite, when the output voltage $V_A$ of the device 10 is equal or higher than the output voltage $V_L$ of the supply line 16, the direct current $I_L$ stops flowing. The output voltage $V_A$ of the autonomous power supply device 10 generates a direct current $I_A$ which flows towards lower voltage potentials, i.e. the traction unit 5. Thanks to the diode 30, the direct current $I_A$ does not flow through the pantograph 14 back to the supply line 16 and the discharge of the autonomous power supply device 10 is prevented. Then, the direct current $I_A$ is absorbed only by the traction unit 5.

When the pantograph 14 quits the terminal section 28 of the supply line 16 and enters the autonomous power supply zone 22, no current is flowing through the line 16 and the pantograph 14. Therefore, no electric arc is generated between the supply line 16 and the pantograph 14.

When the vehicle 1 is in the autonomous power supply zone 22, the driver of the vehicle 1 commands the mechanic unit 15 to drop down the pantograph 14.

Figure 4:
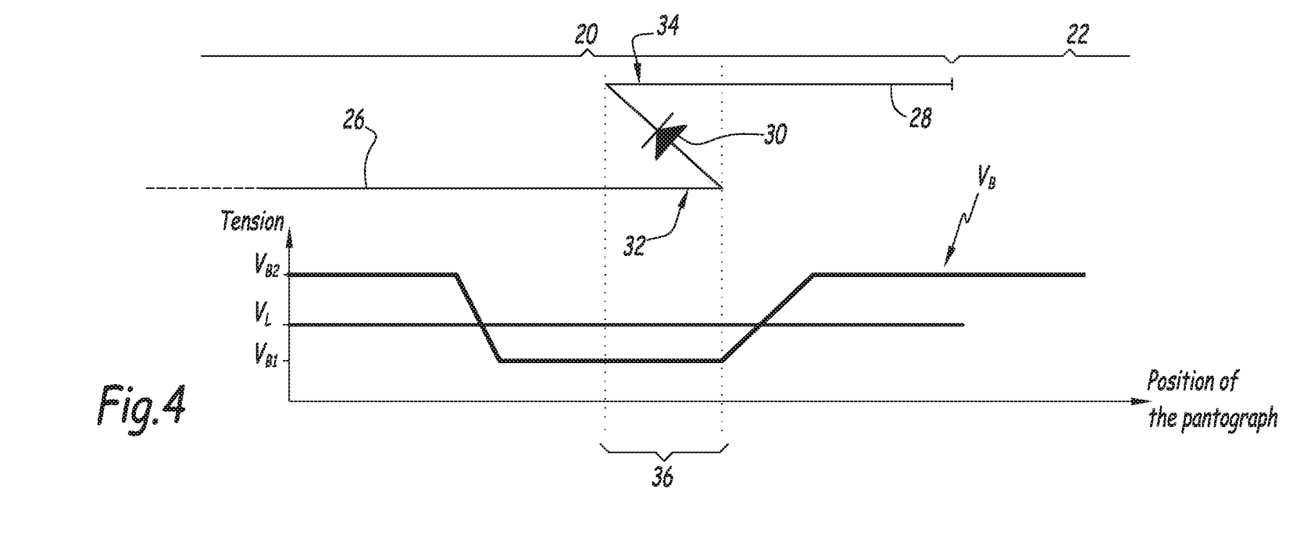
FIG. 4 is a schematic chart similar to FIG. 3 when the vehicle is in braking mode.

In a second operating situation as shown in FIGS. 2 and 4, the vehicle 1 is in the braking mode which means that the traction unit 5 produces electrical power. It is located in the external power supply zone 20. Moreover, the vehicle 1 is moving towards the terminal section 28 and, therefore, towards the autonomous power supply zone 22. The pantograph 14 is raised up and connected to the main section 26 of the supply line 16.

Since the vehicle 1 is in the braking mode, the traction unit 5 produces a voltage $V_B$ and the power supply bus 8 is powered up at this potential. Thus, a direct current $I_B$ is generated in the bus 8 and is used to charge the autonomous power supply device 10 and/or is absorbed by the power supply infrastructure 24 through the pantograph 14 and the supply line 16. In fact, an electric current may flow from the pantograph 14 to the supply line 16 since the pantograph 14 is in contact with the main section 26 where there is no diode. The voltage $V_B$ on the power supply bus 8 has a value $V_{B2}$ which is higher than the output voltage $V_L$ of the supply line 16.

In the motion of the vehicle 1, the detecting unit 38 receives the radio signal from the emitter unit 40 and computes the instants when the pantograph 14 will enter and quit the transition portion 36.

Then, before the pantograph 14 enters the transition portion 36, the control unit 12 begins to vary the voltage $V_B$ on the power supply bus 8. In particular, the control unit 12 sets the voltage $V_B$ at a value $V_{B1}$, which is lower than the output voltage $V_L$ of the supply line 16, by switching on the rheostat choppers.

Since the output voltage $V_B$ is lower than the output voltage $V_L$, the direct current $I_L$ flows from the supply line 16 through the pantograph 14 to the traction unit 5. In other words, during and small before the transition portion 36, even in the braking mode, the traction unit 5 is supplied with the direct current $I_L$ of the supply line 16, so that the bus 8 is powered up at the voltage $V_L$.

For all the time while the pantograph 14 is moving along the transition portion 36, the control unit 12 keeps the voltage $V_B$ lower than the output voltage $V_L$ of the supply line 16, so that the bus 8 is powered up at the voltage $V_L$.

As described above, moving along the transition portion 36, the diode 30 is short circuited by the pantograph 14. In the instant when the pantograph 14 quits the transition portion 36, the diode 30 is no more short circuited by the pantograph 14 and the direct current $I_L$ of the supply line 16 pass through the diode 30, flows in the terminal section 28 and is absorbed by the pantograph 14.

However, in the instant when the pantograph 14 quits the transition portion 36, the control unit 12 begins to vary the voltage $V_B$ on the power supply bus 8. In particular, the control unit 12 sets the voltage $V_B$ at the value $V_{B2}$, which is higher than the output voltage $V_L$ of the supply line 16, by means of the rheostat choppers.

When the output voltage $V_L$ of the supply line 16 is still higher than the voltage $V_B$ on the bus 8, the direct current $I_L$ of the supply line 16 flows through diode 30 and the terminal section 28 and is absorbed by the pantograph 14.

On the opposite, when the voltage $V_B$ on the bus 8 is finally higher than the output voltage $V_L$ of the supply line 16, the direct current $I_L$ stops flowing. The traction unit 5 supplies the rheostat choppers with the direct current $I_B$ generated by the electrical generative braking process of the motor 4. Because of the diode 30, the direct current $I_B$ from the traction unit 5 does not flow through the pantograph 14 back to the supply line 16.

When the pantograph 14 quits the terminal section 28 of the supply line 16 and enters the autonomous power supply zone 22, no current is flowing through the line 16 and the pantograph 14. Therefore, no electric arc is generated between the supply line 16 and the pantograph 14.

When the vehicle 1 is in the autonomous power supply zone 22, the driver of the vehicle 1 commands the mechanic unit 15 to drop down the pantograph 14.

Figure 5:
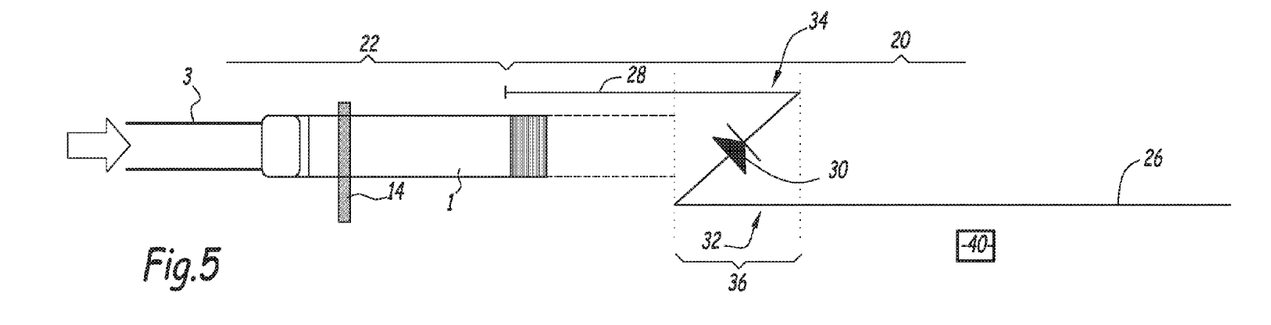
FIG. 5 is a schematic representation similar to FIG. 2 when the vehicle is moving from the autonomous power supply zone towards the external power supply zone.
Figure 6:
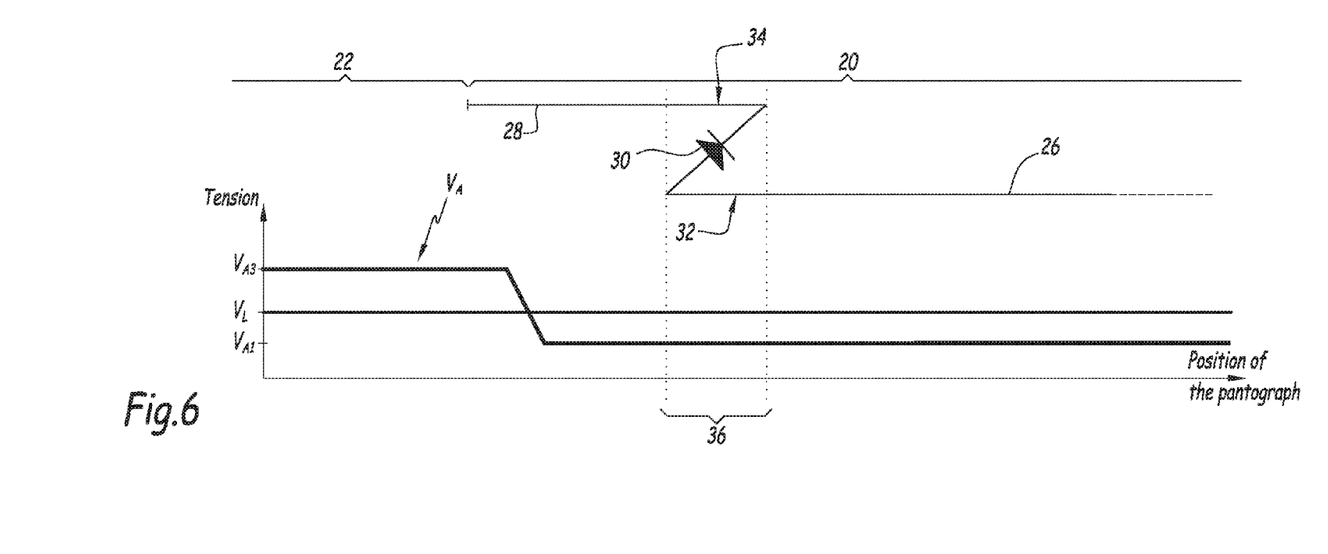
FIG. 6 is a schematic chart similar to FIG. 3, when the vehicle is moving according to FIG. 5 and is in the traction mode, the two power supply voltages being according to a first case.
Figure 7:
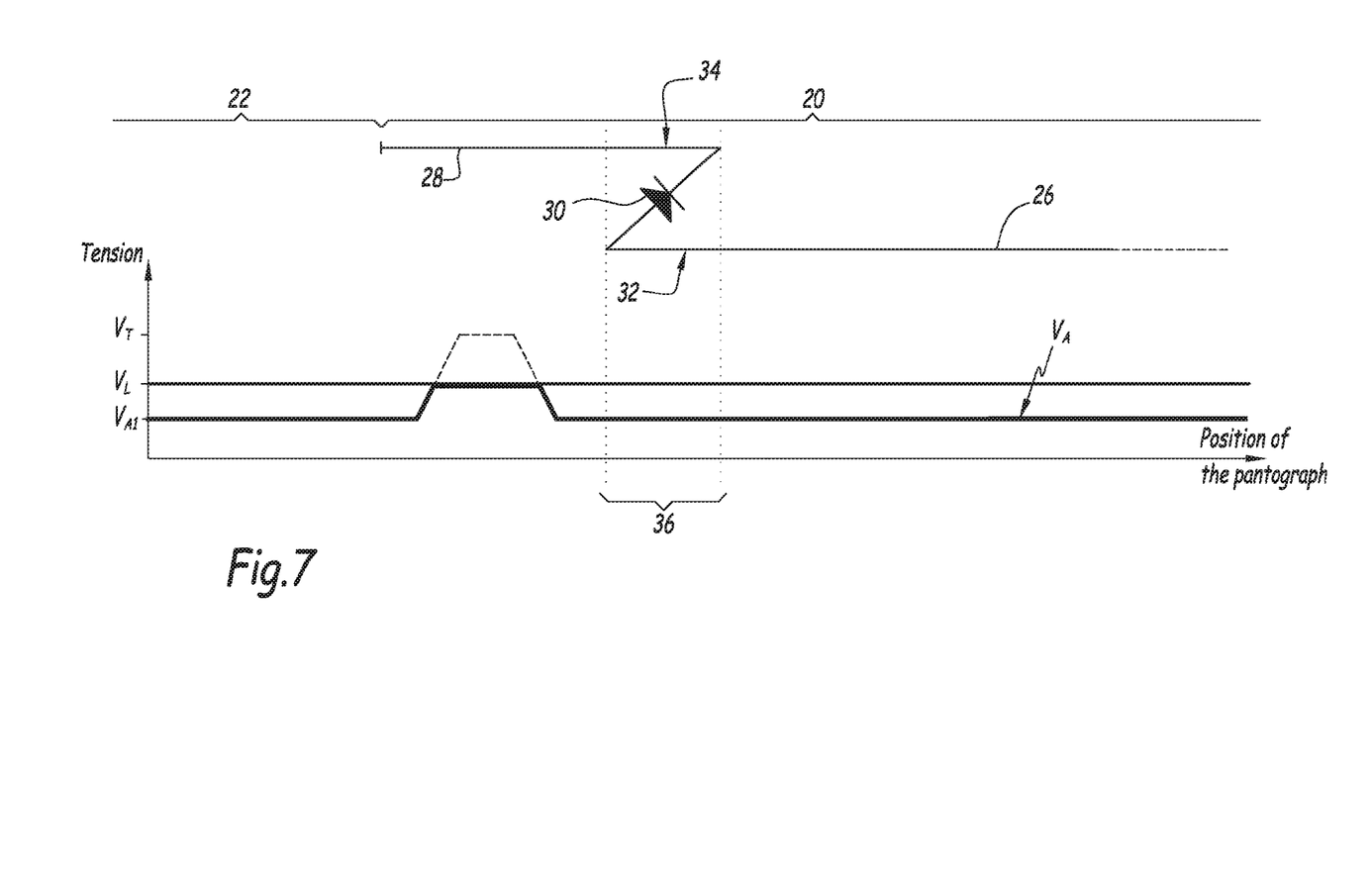
FIG. 7 is a schematic chart similar to FIG. 6, the two power supply voltages being according to a second case.

In a third operating situation shown in FIGS. 5, 6 and 7, the vehicle 1 is in the traction mode and located in the autonomous power supply zone 22. Moreover, the vehicle 1 is moving towards the terminal section 28 of the supply line 16 and, therefore, towards the external power supply zone 20. The pantograph 14 is dropped down since the traction unit 5 of the vehicle 1 is supplied by the autonomous power supply device 10 with the direct current $I_A$. As the current sensor 11 measures no current in the external line 9 and the real value of the output voltage $V_L$ of the supply line 16 is not known, the output voltage $V_A$ of the autonomous power supply device 10 is set by the control unit 12 at a value $V_{A3}$ which is a high voltage, for example, equal to 900V. Thus, the voltage $V_{A3}$ allows improving efficiency of the power supply system 18.

Since the vehicle 1 is approaching the external power supply zone 20, the driver of the vehicle 1 commands the mechanic unit 15 to raise up the pantograph 14. In the motion of the vehicle 1, the detecting unit 38 receives the radio signal from the emitter unit 40 and computes the instant when the pantograph 14 will be in contact with the terminal section 28.

Once pantograph 14 is connected to the terminal section 28 of the supply line 16, the output voltage $V_A$, which is at the value $V_{A3}$, can be higher or lower than the output voltage $V_L$.

If the voltage $V_A$ is higher than the voltage $V_L$, no electric arc is generated between the pantograph 14 and the supply line 16. Then, before the pantograph 14 enters the transition portion 36, the control unit 12 begins to vary the output voltage $V_A$. In particular, the control unit 12 sets the output voltage $V_A$ at the value $V_{A1}$ which is lower than the output voltage $V_L$ of the supply line 16.

If the voltage $V_A$ is lower than the voltage $V_L$, an inrush current flows in the terminal section 28 and is absorbed by the pantograph 14. The inductance 13 acts as a filter and attenuates the inrush current. The output voltage $V_A$ in the power supply bus 8 increases rapidly towards the voltage value of the output voltage $V_L$. By means of the rheostat choppers, the control unit 12 sets the output voltage $V_A$ at the value $V_{A1}$ so that the direct current $I_L$ is absorbed by the pantograph 14. In the case of a voltage peak of the output voltage $V_A$ in the power supply bus 8 which exceeds a fixed threshold $V_T$, for example 1100V, as shown in dotted line on FIG. 7, the rheostats choppers acts as a crowbar circuit in order to regulate the output voltage $V_A$ at the value $V_{A1}$.

When the output voltage $V_L$ of the supply line 16 became higher than the output voltage $V_A$ of the device 10 and the pantograph 14 has not yet entered the transition portion 36, a direct current $I_L$ of the supply line 16 passes the diode 30 and is absorbed by the pantograph 14. In other words, the traction unit 5 of the vehicle 1 is supplied by the supply line 16.

When the pantograph 14 enters the transition portion 36, the diode 30 is short circuited by the pantograph 14 and the diode 30 is passing the direct current $I_L$ of the supply line 16.

When the pantograph 14 quits the transition portion 36 and enters the main section 26, the output voltage $V_L$ of the supply line 16 is always higher than the output voltage $V_A$ of the device 10 and the vehicle 1 is supplied by the supply line 16.

Figure 8:
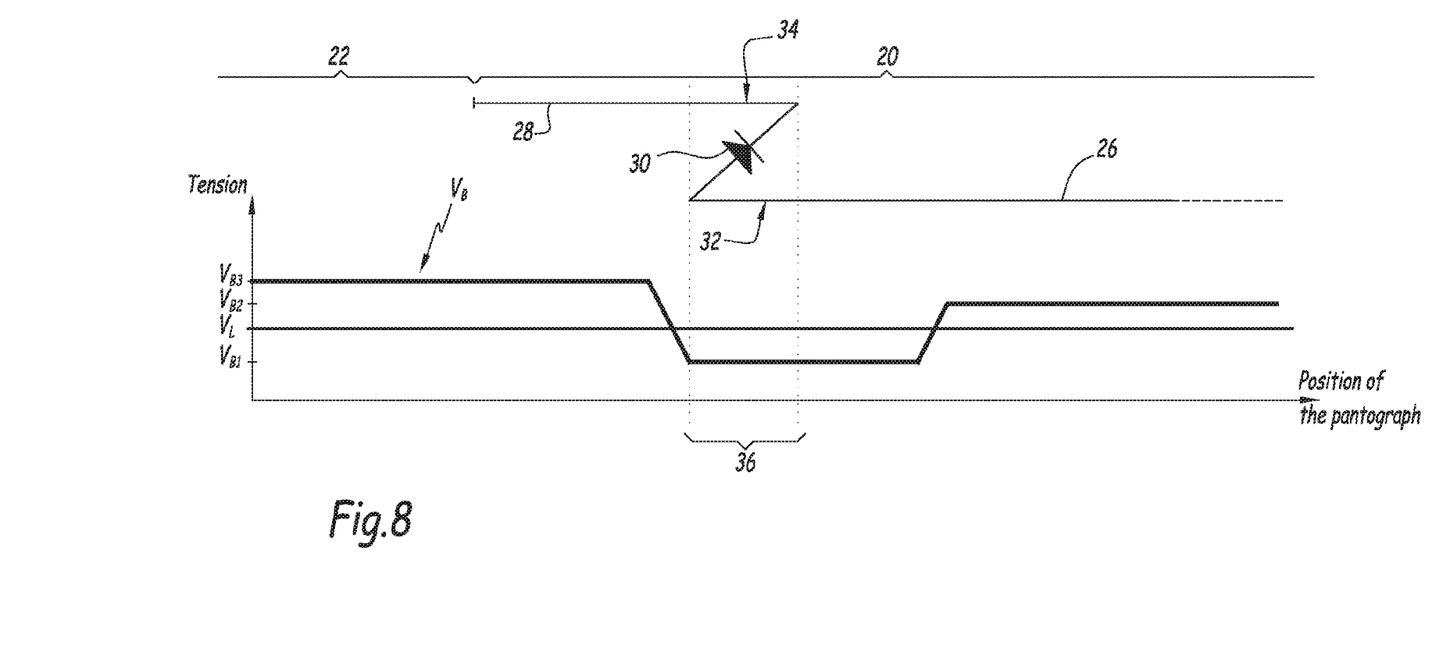
FIG. 8 is a schematic chart similar to FIG. 6, when the vehicle is in the braking mode.
Figure 9:
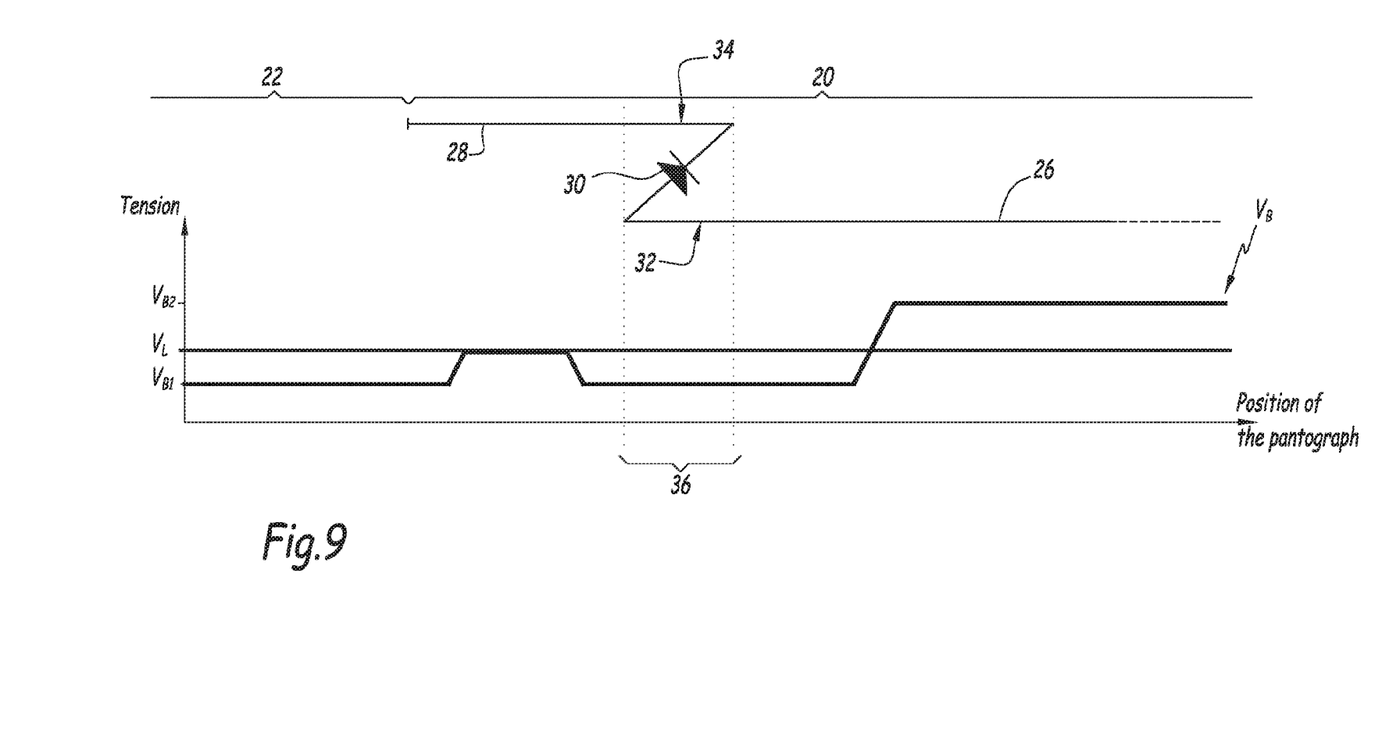
FIG. 9 is a schematic chart similar to FIG. 7.

In a fourth operating situation shown in FIGS. 5, 8 and 9, the vehicle 1 is in the braking mode and located in the autonomous power supply zone 22. Moreover, the vehicle 1 is moving towards the terminal section 28 of the supply line 16 and, therefore, towards the external power supply zone 20. The pantograph 14 is dropped down and the real value of the output voltage $V_L$ of the supply line 16 is not known. Since the vehicle 1 is in the braking mode, the traction unit 5 produces the voltage $V_B$ and the power supply bus 8 is powered up at this potential. Thus, a direct current $I_B$ is generated on the bus 8 and is used to charge the autonomous power supply device 10. The voltage $V_B$ on the power supply bus 8 has a value $V_{B3}$ which is a high voltage, for example, equal to 900V. Since the vehicle 1 is approaching the external power supply zone 20, the driver of the vehicle 1 commands the mechanic unit 15 to raise up the pantograph 14. In the motion of the vehicle 1, the detecting unit 38 receives the radio signal from the emitter unit 40 and computes the instant when the pantograph 14 will be in contact with the terminal section 28.

When the pantograph gets in contact with the terminal section 28 of the supply line 16, no electric arc is generated between the pantograph 14 and the supply line 16, Once pantograph 14 is connected to the terminal section 28, of the supply line 16, the output voltage $V_B$, which is at the value $V_{B3}$, can be higher or lower than the output voltage $V_L$.

If the voltage $V_B$ is higher than the voltage $V_L$, no electric arc is generated between the pantograph 14 and the supply line 16 and the diode 30 prevents the direct current $I_B$ from flowing back to the supply line 16. Then, before the pantograph 14 enters the transition portion 36, the control unit 12 begins to vary the voltage $V_B$. In particular, the control unit 12 sets the voltage $V_B$ at the value $V_{B1}$, which is lower than the output voltage $V_L$ of the supply line 16, by means of the rheostat choppers. When the pantograph 14 enters the transition portion 36, the output voltage $V_L$ of the supply line 16 is higher than the voltage $V_B$ on the bus 8 and the diode 30 is short circuited by the pantograph 14. The direct current $I_L$ of the supply line 16 is absorbed by the pantograph 14. In other words, even in the braking mode, the traction unit 5 of the vehicle 1 is supplied by the supply line 16. In the instant when the pantograph 14 quits the transition portion 36, the control unit 12 begins to vary the voltage $V_B$ on the power supply bus 8. In particular, the control unit 12 sets the voltage $V_B$ at the value $V_{B2}$, which is higher than the output voltage $V_L$ of the supply line 16, by means of the rheostat choppers. When the voltage $V_B$ on the bus 8 is higher than the output voltage $V_L$ of the supply line 16, the direct current $I_L$ stops flowing. The traction unit 5 generates the direct current $I_B$ by means of the electrical generative braking process of the motor 4.

If the voltage $V_B$ is lower than the voltage $V_L$, the inrush current flows in the terminal section 28 and is absorbed by the pantograph 14. The inductance 13 acts as a filter and attenuates the inrush current. The output voltage $V_B$ in the power supply bus 8 increases rapidly towards the voltage value of the output voltage $V_L$. By means of the rheostat choppers, the control unit 12 sets the output voltage $V_B$ at the value $V_{B1}$ so that the direct current $I_L$ is absorbed by the pantograph 14. When the pantograph 14 enters the transition portion 36, the output voltage $V_L$ of the supply line 16 is higher than the voltage $V_B$ on the bus 8 and the diode 30 is short circuited by the pantograph 14. The direct current $I_L$ of the supply line 16 is absorbed by the pantograph 14.

In the instant when the pantograph 14 quits the transition portion 36, the control unit 12 begins to vary the voltage $V_B$ on the power supply bus 8. In particular, the control unit 12 sets the voltage $V_B$ at the value $V_{B2}$, which is higher than the output voltage $V_L$ of the supply line 16, by means of the rheostat choppers.

In all the operating situations, when the diode is crossed by the current $I_L$, that lasts for a short time. The diode 30, then, does not need any cooling system or adapted precaution device. The operating situations and the embodiments mentioned here-above can be combined in order to generate new embodiments and operating situations of the invention.

What is claimed is:

1. An electrical power supply system for an electrically propelled vehicle provided with a traction unit and an electrical connector and moving along a circulation rail, the system comprising:
    an external power supply zone, having a supply line extending along the circulation rail for connection with the electrical connector, the supply line being connected to a power supply infrastructure,
    an autonomous power supply zone, located after the external power supply zone along the circulation rail, where the vehicle is supplied by means of an autonomous power supply device,
    the supply line including a main section, provided with a first end, the supply line further comprising:
        a terminal section, extending along the circulation rail in the external power supply zone at least between the first end of the main section and the autonomous power supply zone, for connection with the electrical connector and provided with a second end,
        a diode, electrically connecting the first end of the main section and the second end of the terminal section and designed to let passing through an electrical current from the main section to the terminal section,
    wherein the first end of the main section and the second end of the terminal section are partially overlapped on a transition portion along the direction of the circulation rail and the supply line is designed for the diode to be short-circuited between the first end of the main section and the second end of the terminal section by the electrical connector.

2. An electric power supply system according to claim 1, wherein the terminal section has a floating voltage and is isolated, except from the main section and the electrical connector.

3. An electric power supply system according to claim 1, further comprising a detector configured to predict in time the position of the electrical connector of the vehicle along the supply line.

4. An electrical power supply system according to claim 1, further comprising:
    an output voltage driver configured to drive the output voltage of the autonomous power supply device of the vehicle in relation to an output voltage of the supply line, when the electrical connector of the vehicle is connected to the terminal section from the external power supply zone, and
    a disconnector configured to disconnect the electrical connector of the vehicle only from the terminal section of the supply line.

5. An electrical power supply system according to claim 4, further comprising an output voltage controller configured to set the output voltage of the autonomous power supply device higher than the output voltage of the supply line while the electrical connector of the vehicle is in the terminal section and the vehicle is in a traction mode, in which the traction unit of the vehicle transforms the power supply in kinetic energy.

6. An electric power supply system according to claim 4, further comprising an output voltage controller configured to set the output voltage of the autonomous power supply device lower than the output voltage of the supply line while the electrical connector of the vehicle is before the terminal section, and to set the output voltage of the autonomous power supply device higher than the output voltage of the supply line while the electrical connector of the vehicle is in the terminal section, when the vehicle is in a braking mode, in which the traction unit of the vehicle transforms the kinetic energy into electrical energy.

7. An electrical power supply system according to claim 1, further comprising:
    a connector for connecting the electrical connector of the vehicle only to the terminal section of the supply line, and
    an output voltage driver for driving of an output voltage of the autonomous power supply device of the vehicle in relation to an output voltage of the supply line, when the electrical connector of the vehicle is connected to the terminal section from the autonomous power supply zone.

8. An electrical power supply system according to claim 7, further comprising an output voltage controller configured to set the output voltage of the autonomous power supply device lower than the output voltage of the supply line while the electrical connector of the vehicle is in the terminal section and the vehicle is in a traction mode, in which the traction unit of the vehicle transforms the power supply in kinetic energy.

9. An electric power supply system according to claim 7, further comprising an output voltage controller configured to set the output voltage of the autonomous power supply device lower than the output voltage of the supply line while the electrical connector of the vehicle is before the main section, and to set the output voltage of the autonomous power supply device higher than the output voltage of the supply line while the electrical connector of the vehicle is in the main section, when the vehicle is in braking mode, in which the traction unit of the vehicle transforms the kinetic energy into electrical energy.

* * * * *